United States Patent Office 3,562,326
Patented Feb. 9, 1971

3,562,326
SUBSTITUTED FORMAMIDINES
Angelo John Speziale, Creve Coeur, and Lowell R. Smith, Chesterfield, Mo., assignors to Monsanto Company, St. Louis, Mo., a corporation of Delaware
No Drawing. Filed June 17, 1968, Ser. No. 737,345
Int. Cl. C07d 103/44
U.S. Cl. 260—561        7 Claims

ABSTRACT OF THE DISCLOSURE

Substituted formamidines of the formula

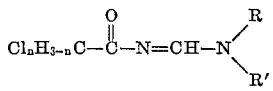

wherein $n$ is a whole number from 1 to 3, inclusive, wherein R and R' are like or unlike and are aliphatic containing from 1 to 4 carbon atoms, inclusive, and containing from 0 to 3 chloro substituents, inclusive. R' can also be phenyl or monochloro- or dichloro substituted phenyl. The compounds exhibit pre-emergent phytocidal activity.

---

This invention relates to new and useful substituted formamidines of the general formula

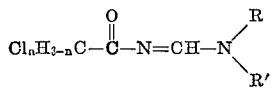

wherein $n$ is a whole number from 1 to 3, inclusive, but preferably 3, wherein R and R' are like or unlike and are aliphatic containing from 1 to 4 carbon atoms, inclusive, and containing from 0 to 3 chloro substituents, inclusive, namely alkyl, alkenyl, chloroalkyl or chloroalkenyl, such as methyl, ethyl, propyl, butyl, allyl, butenyl, chloroethyl, dichloroethyl, chloropropyl, trichlorobutyl, chloroallyl, dichloroallyl, trichloroallyl, chlorobutenyl, dichlorobutenyl, trichlorobutenyl, and the various isomeric forms thereof. R' can also be phenyl or monochloro- or dichloro substituted phenyl. These compounds are readily prepared by bringing together and reacting an isocyanate of the general formula

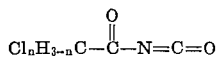

wherein $n$ has the same significance as above with a substantially equimolecular proportion of a formamide of the formula

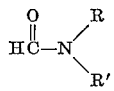

wherein R and R', respectively, have the same significance as above, in the presence of an inert organic liquid or solvent in a fluid system, that is above the freezing point of the system up to and including the boiling point of the system.

As illustrative of the preparation of the compounds of this invention but not limitative thereof is the following:

EXAMPLE I

To a suitable reaction vessel equipped with a thermometer, agitator and reflux condenser is charged approximately 3.65 parts by weight of dimethylformamide and approximately 44 parts by weight of benzene. While agitating the so-charged mass approximately 9.90 parts by weight of α,α,α-trichloroacetyl isocyanate is slowly added and the reaction mass agitated for about one hour (During the addition of the isocyanate carbon dioxide evolved.) heated up to its boiling point, and then refluxed for about one hour. Thereupon the mass is cooled and under vacuum stripped of benzene and other volatiles. The solid residue is then taken up with a methylenechloride-hexane mixture and re-crystallized therefrom to give N,N-dimethyl-N'-(α,α,α-trichloroacetyl) formamidine

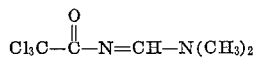

which melts at 55–56° C.

EXAMPLE II

To a suitable reaction vessel equipped with a thermometer, agitator and reflux condenser there is charged approximately 6.75 parts by weight of N-phenyl-N-methyl formamide, approximately 9.4 parts by weight of α,α,α-trichloroacetyl isocyanate, and approximately 87 parts by weight of toluene. Thereupon the so-charged mass is refluxed for about 16 hours. The mass is then cooled and stripped in vacuo of toluene and other volatiles. The solid residue is then taken up with a methylene chloride-hexane mixture containing charcoal and re-crystallized therefrom to give N-phenyl-N-methyl-N'-(α,α,α-trichloroacetyl) formamidine

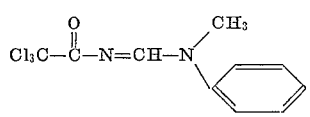

which melts at 61–62° C.

In like manner to the above described procedural operations but employing the appropriate chloro substituted acetyl isocyanate and the appropriate N,N-disubstituted formamide the following formamidines are prepared:

N,N-diethyl-N'-(α,α,α-trichloroacetyl) formamidine,
N,N-di-n-propyl-N'-(α,α,α-trichloroacetyl) formamidine,
N,N-diallyl-N'-(α,α,α-trichloroacetyl) formamidine,
N,N-di-n-butyl-N'-(α,α,α-trichloroacetyl) formamidine,
N-methyl-N-(2-chloroallyl)-N'-(α,α,α-trichloroacetyl) formamidine,
N-methyl-N-isopropyl-N'-(α,α,α-trichloroacetyl) formamidine,
N-phenyl-N-ethyl-N'-(α,α,α-trichloroacetyl) formamidine,
N-phenyl-N-allyl-N'-(α,α,α-trichloroacetyl) formamidine,
N-phenyl-N-isopropyl-N'-(α,α,α-trichloroacetyl) formamidine,
N-(4-chlorophenyl)-N-methyl-N'-(α,α,α-trichloroacetyl) formamidine,
N,N-dimethyl-N'-(α,α,α-trichloroacetyl) formamidine,
N,N-diallyl-N'-(α,α-dichloroacetyl) formamidine,
N,N-di-n-propyl-N'-(α,α-dichloroacetyl) formamidine,
N-(2,3,3-trichloroallyl)-N-methyl-N'-(α,α-dichloroacetyl) formamidine,
N-isopropyl-N-methyl-N'-(α,α-dichloroacetyl) formamidine,
N-phenyl-N-methyl-N'-(α,α-dichloroacetyl) formamidine,
N-phenyl-N-isopropyl-N'-(α,α-dichloroacetyl) formamidine,
N,N-dimethyl-N'-(α-chloroacetyl) formamidine,
N,N-di(2,3-dichloroallyl)-N'-(α-chloroacetyl) formamidine,
N-isopropyl-N-methyl-N'-(α-chloroacetyl) formamidine,
N-isobutyl-N-ethyl-N'-(α-chloroacetyl) formamidine,
N-phenyl-N-methyl-N'-(α-chloroacetyl) formamidine,
N-phenyl-N-isopropyl-N'-(α-chloroacetyl) formamidine,
N-phenyl-N-isopropyl-N'-(α-chloroacetyl) formamidine,
etc.

The methods by which the aforedescribed compounds of this invention are isolated will vary slightly with the reactants employed and the product produced. Further purification by selective solvent extraction or by absorptive agents such as activated carbon or clays can precede the removal of the inert organic liquid (or solvent) when the latter is employed. Additionally an inert organic solvent can be added to and in the purification by absorptive agents. However, in that the products are phytocidally active they are generally satisfactory for phytocidal purposes without further purification.

In the procedural operations set forth herein before in addition to benzene and toluene, the various xylenes can be used, or mixtures thereof as can hexane, heptane, octane, etc. and mixtures thereof. The reaction is preferably conducted at a temperature above about 70° C. to about 200° C. under atmospheric pressure in a dry atmosphere until the carbon dioxide by-product ceases to evolve from the reaction mass.

The compounds of this invention are uniquely useful in inhibiting the growth of noxious gasses (i.e. narrow leaf plants) and noxious broad leaf weed plants exclusive of broad leaf crop plants prior to their respective emergence from soil or other growth media by treating said soil or other growth media with an effective growth inhibiting amount thereof. To illustrate their unique pre-emergent phytocidal activity, but not limitative thereof, is the following:

Seeds of a variety of several different plants itemized hereinafter each representing a principal botanical species are planted in each of several aluminum pans by scattering them randomly over the surface of a good grade of top soil treated with 0.05% by weight based thereon of a resinous polyelectrolyte soil conditioner which was compacted to a depth of ⅜" from the top of each pan. The so-seeded respective pans are then covered with ⅜" of the aforesaid prepared soil mixture and the respective pans levelled.

The levelled surface of the soil in each pan, exclusive of the control pan, is then sprayed with an aliquot of acetone containing the following compounds each at the rate of 25 pounds per acre, which compounds are identified by code as follows:

Compound
N,N-dimethyl-N'-(α,α,α-trichloroacetyl) formamidine _____ A
N-phenyl-N-methyl-N'-(α,α,α-trichloroacetyl) formamidine _____ B
N,N-dimethyl-N'-(2-chlorophenyl) formamidine _____ C The respective pans are placed in a sand bench and ½" of water added to the bench. The soil absorbs moisture through perforations in the bottom of the respective pans until the soil surface of each is about one-half moist, by which time the excess water in the sand bench is drained off. The remaining soil surface in each pan is moistened by capillary action.

Fourteen days later in the greenhouse under ordinary conditions of sunlight and watering after the said application of each of the afore-itemized compounds the results are observed and recorded. The number of plants which emerged from the soil are counted and converted to a phytocidal rating by means of a fixed scale based on average percent emergence. (Emergence rates are established for all new seed lots and periodic checks run on old seed in current use.) The scale used is as follows:

CONVERSION SCALE

| Seed lot percent emergence (control): | 3 | 2 | 1 | 0 |
|---|---|---|---|---|
| | (Number of plants emerging) | | | |
| 100 | 0-5 | 6-10 | 11-15 | 16-20 |
| 90 | 0-5 | 6-9 | 10-13 | 14-20 |
| 80 | 0-4 | 5-8 | 9-12 | 13-20 |
| 70 | 0-4 | 5-7 | 8-11 | 12-20 |
| 60 | 0-3 | 4-6 | 7-9 | 10-20 |
| 50 | 0-3 | 4-5 | 6-8 | 9-20 |
| 40 | 0-2 | 3-4 | 5-6 | 7-20 |

The relative emergence value of the respective afore-itemized compounds with respect to their phytocidal effects on each plant is indicated by a number as follows:

0 = No inhibition.
1 = Slight inhibition.
2 = Moderate inhibition.
3 = Severe inhibition.

TABLE I

| | Plant/compound | | | |
|---|---|---|---|---|
| | A | B | C | Control |
| (Grasses): | | | | |
| Wild oat | 3 | 3 | 0 | 0 |
| Brome grass | 3 | 3 | 0 | 0 |
| Rye grass | 3 | 3 | 0 | 0 |
| Foxtail | 3 | 3 | 0 | 0 |
| Crab grass | 3 | 3 | 0 | 0 |
| Sorghum | 3 | 3 | 0 | 0 |
| (Broad leaf): | | | | |
| Radish | 0 | 0 | 0 | 0 |
| Sugar beet | 0 | 0 | 0 | 0 |
| Pigweed | 3 | 3 | 3 | 0 |
| Tomato | 0 | 0 | 0 | 0 |

As further illustrative of the unique pre-emergent phytocidal activity, but not limited thereof, is the following:

Seeds of a variety of several different plants itemized hereinafter each representing a principal botanical species are planted in each of several aluminum pans by scattering them randomly over the surface of a good grade of top soil treated with 0.05% by weight based thereon of a resinous polyelectrolyte soil conditioner which was compacted to a depth of ⅜" from the top of each pan. The so-seeded respective pans are then covered with ⅜" of the aforesaid prepared soil mixture having intimately mixed therewith an aliquot of acetone containing the following itemized compounds each in an amount providing a rate of 5 pounds per acre, which compounds are identified by code as follows, and the respective pans levelled:

Compound
N,N-dimethyl-N'-(α,α,α-trichloroacetyl) formamidine _ A
N,N-dimethyl-N'-(3-chlorophenyl) formamidine ____ D
N,N-dimethyl-N'-(4-chlorophenyl) formamidine ____ E
N,N-dimethyl-N'-(3,4-dichlorophenyl) formamidine _ F The respective pans are placed in a said bench and ½" of water added to the bench. The soil absorbs moisture through perforations in the bottom of the respective pans until the soil surface of each is about one-half moist, by which time the excess water in the sand bench is drained off. The remaining soil surface in each pan is moistened by capillary action.

Fourteen days later in the greenhouse under ordinary conditions of sunlight and watering after the said application of each of the afore-itemized compounds the results are observed and recorded. The number of plants which emerged from the soil are counted and converted to a phytocidal rating by means of a fixed scale based on average percent emergence. (Emergence rates are established for all new seed lots and periodic checks run on old seed in current use.) The scale used is as follows:

CONVERSION SCALE

| Seed lot percent emergence (control) | 3 | 2 | 1 | 0 |
|---|---|---|---|---|
| | (Number of plants emerging) | | | |
| 100 | 0.5 | 6-10 | 11-15 | 16-20 |
| 90 | 0-5 | 6-9 | 10-13 | 14-20 |
| 80 | 0-4 | 5-8 | 9-12 | 13-20 |
| 70 | 0-4 | 5-7 | 8-11 | 12-20 |
| 60 | 0-3 | 4-6 | 7-9 | 10-20 |
| 50 | 0-3 | 4-5 | 6-8 | 9-20 |
| 40 | 0-2 | 3-4 | 5-6 | 7-20 |

The relative emergence value of the respective afore-itemized compounds with respect to their phytocidal effects on each plant is indicated by a number as follows:

0=No inhibition.
1=Slight inhibition.
2=Moderate inhibition.
3=Severe inhibition.

TABLE II

|  | Plant compound | | | | |
| --- | --- | --- | --- | --- | --- |
|  | A* | D | E | F | Control |
| (Grasses): |  |  |  |  |  |
| Wild oat | 1 | 0 | 0 | 0 | 0 |
| Brome grass | 1 | 0 | 0 | 0 | 0 |
| Rye grass | 1 | 0 | 0 | 0 | 0 |
| Foxtail | 3 | 0 | 0 | 0 | 0 |
| Crab grass | 3 | 0 | 1 | 0 | 0 |
| Sorghum | 3 | 0 | 0 | 0 | 0 |
| (Broad leaf): |  |  |  |  |  |
| Radish | 0 | 0 | 0 | 0 | 0 |
| Sugar beet | 0 | 1 | 1 | 0 | 0 |
| Pigweed | 3 | 1 | 3 | 0 | 0 |
| Tomato | 0 | 0 | 1 | 0 | 0 |

* In addition Compound A did not inhibit the emergence of corn or cotton in this evaluation.

From the foregoing pre-emergent phytocidal evaluation data it is apparent that the N,N-disubstituted-N'-(chloro substituted acetyl) formamidines of this invention are effective preemergence herbicides. Valuable pre-emergent phytocidal effects will be observed by applications of small amounts, for example, as low as 0.1 lb. of active component per acre as well as higher concentrations, for example, 30 lbs. per acre. The preferred range of application for pre-emergent phyocidal purposes is from about 1 to 15 lbs. per acre.

It will be apparent that different effects can be obtained by modifying the method of use. For this reason an essential part of this invention is the formulation thereof so as to permit a uniform predetermined application of the new phytocides to soil or other growth media so as to produce the desired tffect. By proper selection and proportioning of the various conditioning agents either liquid or solid formulations can be prepared, and so as to adapt the new phytocide for achieving the desired result with any conventional device for treating the surface or sub-surface of the soil or other growth media.

Although the compounds of this invention are useful per se in cntrolling a wide variety of plant growth in the pre-emergent state, it is preferable that they be supplied to the plant growing medium in a dispsersed form in a suitable extending agent.

In the instant specification and appended claims it is to be understood that the term "dispersed" is used in its widest possible sense. When it is said that the compound of this invention are dispersed, it means that the particles thereof can be molecular in size and held in true solution in a suitable organic solvent. It means further that the particles can be colloidal in size and distributed throughout a liquid phase in the form of suspensions or emulsions or in the form of particles held in suspension by wetting agent. The term "dispersed" also means that the particles can be mixed with and distributed throughout a solid carrier providing a mixture in particulate form e.g. pellets, granules, powders, or dusts.

The exact concentration of the compounds of this invention employed in combatting or controlling noxious vegetation can vary considerably provided the required dosage (i.e. phytotoxic amount) thereof is supplied to the plant growing medium. From a practical point of view, the manufacturer must supply the agriculturist with a low-cost concentrate or spray base or particulate solid base in such form, that by merely mixing with water or solid extender (eg., powdered clay or talc) or other low-cost material available to the agriculturist at the point of use, he will have an easily prepared phytocidal spray or particulate solid. In such a concentrate composition, a compound of this invention generally will be present in a concentration of 5 to 95 percent by weight, the residue being any one or more of the well-known phytocidal adjuvants, such as the various surface active agents (e.g. detergents, a soap or other emulsifying or wetting agent), surface active clays, solvents, diluents, carrier media, adhesives, spreading agents, humectants, and the like.

There are a large number of organic liquids which can be used for the preparation of solutions, suspensions or emulsions of the compounds of this invention. For example, isopropyl ether, acetone, methyl ethyl ketone, dioxane, cyclohexanone, carbon tetrachloride, ethylene dichloride, tetrachloroethane, hexane, heptane and like higher liquid alkanes, hydrogenate naphthalenes, solvent naphtha, benzene, toluene, xylene, petroleum fractions (e.g. those boiling almost entirely under 400° F. and having a flash point above about 80° F., particularly kerosene), mineral oils and the like.

The compounds of this invention are preferably applied to the plant growing medium in the form of emulsions or suspensions. Emulsions or suspensions are prepared by dispersing a compound of this invention either per se or in the form of an organic solution thereof in water with the aid of a water-soluble surfactant. The term "surfactant" as employed here in the appended claims is used as in Volume II of Schwartz, Perry and Berch's "Surface Active Agents and Detergents" (1958, Interscience Publishers, Inc., New York) in place of the expression "emulsifying agent," to connote generically the various "emulsifying agents," "dispersing agents," "wetting agents" and "spreading agents" that are adapted to be admixed with the active compounds of this invention in order to secure better wetting and spreading of the new phytocidal ingredient in the water vehicle or carrier in which it is insoluble through lowering the surface tension of the water (see also Frear "Chemistry of Insecticides, Fungicides and Herbicides," second edition, 1948, page 280). These surfactants include the well-known capillary active substances which may be anion-active (or anionic), or, and preferably, non-ionizing (or non-ionic) which are described in detail in Volume I and II of Schwartz, Perry and Berch's "Surface Active Agents and Detergents," (1958, Interscience Publishers, Inc., New York) and also in the November 1947 issue of Chemical Industries (pages 811–824) in an article entitled "Synthetic Detergents" by John W. McCutcheon and also in the July, August, September, and October, 1952 issues of Soap and Sanitary Chemicals under the title "Synthetic Detergents." The disclosures of these articles with respect to surfactants, i.e. the anion-active and non-ionizing capillary active substances are incorporated in this specification by reference in order to avoid unnecessary enlargement of this specification. The preferred surfactants are the water-soluble non-ionic surface-active agents set forth in U.S. 2,846,398 (issued Aug. 4, 1958).

The compounds of this invention can be dispersed by suitable methods (e.g., tumbling or grinding) in solid extending agents either of organic or inorganic nature and applied to the plant growing medium in particulate form. Such solid materials include for example, tricalcium phosphate, calcium carbonate, kaoline, bole, kieselguhr, talc, bentonite, fuller's earth, pyrophillite, diatomaceous earth, calcined magnesia, volcanic ash, sulfur and the like inorganic solid materials and include for example, such materials of organic nature as powdered cork, powdered wood, and powdered walnut shells. The preferred solid carriers are the adsorbent clays, e.g. attapulgus clay. These mixtures can be used for phytocidal purposes in the dry form or by addition of water-soluble surfactants or wetting agents the dry particulate solids can be rendered wettable by water so as to obtain stable aqueous dispersions or suspensions suitable for use as sprays.

In all of the forms described above the dispersions can be provided ready for use in combatting noxious vegetation or they can be provided in a concentrated form suitable for mixing with or dispersing in other extending agents. As illustrative of a particularly useful concentrate is an intimate mixture of a compound of this invention with a water-soluble non-ionic surfactant which lowers the surface tension of water in the weight proportions of 0.1 to 15 parts of surfactant with sufficient of a compound of this invention to make 100 parts by weight. Such a concentrate is particularly adapted to be made into a spray for combatting various forms of noxious vegetation by the addition of water thereto. As illustrative of such a concentrate is an intimate mixture of 95 parts by weight of N,N-dimethyl-N'-($\alpha,\alpha,\alpha$-trichloroacetyl)formamidine and 5 parts by weight of a water-soluble non-ionic surfactant such as polyoxyethylene derivative of sorbitan monolaurate.

Another useful concentrate adapted to be made into a spray for combatting noxious vegetation is a solution (preferably as concentrated as possible) of a compound of this invention in an organic solvent therefor. The said liquid concentrate preferably contains dissolved therein a minor amount (e.g. 0.5 to 10 percent by weight of the weight of the new phytocidal agent) of a surfactant (or emulsifying agent), which surfactant is water-soluble. As illustrative of such a concentrate is a solution of N,N-dimethyl-N'-($\alpha,\alpha,\alpha$-trichloroacetyl) formamidine in acetone which solution contains dissolved therein a water-soluble non-ionic surfactant.

Of the surfactants aforementioned in preparing the various emulsifiable, wettable or dispersible compositions or concentrates of this invention, the non-ionic surfactants are preferred. Of the non-ionic surfactants the particularly preferred are the water-soluble polyoxyethylene derivatives of alkylphenols (particularly isooctylphenol) and the water-soluble polyoxyethylene derivatives of the mono-higher fatty acid esters of sorbitan respectively containing 15 to 30 moles of ethylene oxide per mole of sorbitan mono-ester of alkylphenol.

The compounds of this invention can also be advantageously employed in combination with other pesticides, including, for example, fungicides, nematocides, bactericides, and insecticides. In this manner it is possible to obtain mixtures which are effective against a wide variety of pests and other forms of noxious life.

While this invention has been described with respect to certain embodiments, it is to be understood that it is not so limited and that variations and modifications thereof obvious to those skilled in the art can be made without departing from the spirit and scope thereof.

What is claimed is
1. A substituted formamidine of the general formula

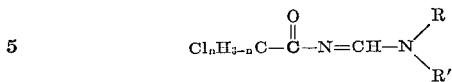

wherein $n$ is a whole number from 1 to 3, inclusive, wherein R is aliphatic containing from 0 to 3 chloro substituents, inclusive, and containing from 1 to 4 carbon atoms, inclusive, and is selected from the group consisting of alkyl, alkenyl, chloroalkyl and chloroalkenyl, and wherein R' is selected from the group consisting of (a) aliphatic containing from 0 to 3 chloro substituents, inclusive, and containing from 1 to 4 carbon atoms, inclusive, and is selected from the group consisting of alkyl, alkenyl, chloroalkyl and chloroalkenyl, and (b) phenyl, and phenyl substituted by from 1 to 2 chloro substituents, inclusive.

2. A compound of claim 1 wherein $n$ is 3 and wherein R and R', respectively, are selected from the group consisting of like and unlike alkyl containing from 1 to 4 carbon atoms.

3. A compound of claim 1 wherein $n$ is 3, wherein R is alkyl containing from 1 to 4 carbon atoms, inclusive, and wherein R' is phenyl.

4. A compound of claim 2 wherein R and R', respectively, are methyl.

5. A compound of claim 2 wherein R and R', respectively, are allyl.

6. A compound of claim 3 wherein R is methyl and wherein R' is phenyl.

7. A compound of claim 3 wherein R is isopropyl and wherein R' is phenyl.

References Cited

Schwartz et al.: "Surface Active Agents and Detergents," 1958, Interscience Publishers, New York.

ALEX MAZEL, Primary Examiner

R. V. RUSH, Assistant Examiner

U.S. Cl. X.R.
71—118; 260—562